United States Patent [19]

Eskandry

[11] Patent Number: 5,337,947
[45] Date of Patent: Aug. 16, 1994

[54] REVERSIBLE TRIANGULAR BOX WITH ADVERTISING AND SAFETY SIGNS ON ALTERNATE FACES

[76] Inventor: Ezra D. Eskandry, 1925 Brickell Ave., D901, Miami, Fla. 33129

[21] Appl. No.: 993,298

[22] Filed: Dec. 18, 1992

[51] Int. Cl.5 .......................... B65D 5/20; B65D 5/46
[52] U.S. Cl. ...................... 229/115; 40/312; 40/903; 206/459.5; 229/117.14; 229/122
[58] Field of Search ................. 229/8.5, 115, 117.14, 229/122; 206/459.5; 232/1 R, 1 E, 43.1; 40/312, 584, 903

[56] References Cited

U.S. PATENT DOCUMENTS

| | | | |
|---|---|---|---|
| 443,397 | 12/1890 | Mack | 229/115 |
| 1,179,720 | 4/1916 | Hart, Jr. | 229/8.5 |
| 2,453,908 | 11/1948 | Harhay | 229/115 |
| 3,254,434 | 6/1966 | Gintoft | 229/115 |
| 3,482,760 | 12/1969 | Pascus et al. | 229/115 |
| 3,550,834 | 12/1970 | McCall | 229/115 |
| 3,690,542 | 9/1972 | Jernstrom | 206/459.5 |
| 3,963,165 | 6/1976 | Hughes | 229/8.5 |
| 4,253,601 | 3/1981 | Kessoff | 229/115 |
| 4,269,348 | 5/1981 | Young | 229/117.14 |
| 4,339,067 | 7/1982 | Bessey | 229/115 |
| 4,444,354 | 4/1984 | Staelgraeve | 40/312 |
| 4,735,356 | 4/1988 | Engel | 229/122 |
| 4,953,779 | 9/1990 | Densen | 40/312 |

FOREIGN PATENT DOCUMENTS

| | | | |
|---|---|---|---|
| 1354939 | 2/1964 | France | 40/584 |
| 90998 | 8/1978 | Japan | 232/43.1 |
| 456442 | 7/1968 | Switzerland | 229/115 |
| 1541131 | 2/1990 | U.S.S.R. | 229/115 |
| 1019065 | 2/1966 | United Kingdom | 229/115 |
| 1502402 | 3/1978 | United Kingdom | 40/903 |

Primary Examiner—Gary E. Elkins
Attorney, Agent, or Firm—Cesarano & Kain

[57] ABSTRACT

The reversible triangular box is a generally rectangular sheet divided into three rectangular sections, each containing a front and back face, by two major folds. Safety sign indicia is printed on one face while advertising indicia is printed on the other face. The minimal construction of the reversible triangular box includes two triangular side sections extending from the intermediate second section. Advertising indicia is printed on one face of each triangular side section and safety sign indicia is printed on the other face. A pair of complementary side locking tab and side locking slot combinations are utilized to removably couple or link a respective triangular side section to a first main box section. A minimal construction box has a first and a second handle portion, one of which extends from a top edge region of the first section and the other one extends from the top edge region of the third section. A retaining device holds the first and second handle panels together when they are juxtaposed. When the triangular box is formed, by insertion of the side locking tabs into the side locking slots and retention of the first and second handle panels, the triangular box simultaneously displays advertising indicia on at least two exposed faces thereof and safety sign indicia on two other distinct exposed faces. Even if the back faces are exposed in formation, display is possible. The rectangular box may further include an elongated slot long enough to accommodate insertion of flat sheet promotional materials therethrough.

14 Claims, 3 Drawing Sheets

5,337,947

REVERSIBLE TRIANGULAR BOX WITH ADVERTISING AND SAFETY SIGNS ON ALTERNATE FACES

The present invention relates to a reversible triangular box with advertising and safety signs on alternate facing sides thereof such that at least two advertising indicia on two independent side faces are simultaneously viewable in addition to at least two safety sign indicia on other distinct side faces of the box.

OBJECTS OF THE INVENTION

It is an object of the present invention to provide a reversible triangular box which simultaneously presents, on independent, distinct, exposed side faces, advertising indicia and safety sign indicia.

It is an object of the present invention to provide a reversible triangular box such that, notwithstanding the manner in which the box is constructed, that is, notwithstanding whether the front faces or the rear or back faces are exposed, at least two exposed faces show safety sign indicia and at least two exposed faces show advertising indicia thereon.

It is an object of the present invention to provide a reversible triangular box which, when the box is constructed, accommodates insertion of flat sheet promotional materials therethrough while simultaneously displaying safety sign and advertising indicia on at least four exposed box faces.

SUMMARY OF THE INVENTION

The reversible triangular box is a generally rectangular sheet divided into three rectangular sections by two major folds. Each section has a front and a back face. Safety sign indicia is printed on one face. On the other face, advertising indicia is printed on the box section. The minimal construction of the reversible triangular box includes two triangular side sections extending from the intermediate second section. Advertising indicia is printed on one face of each triangular side section and safety sign indicia is printed on the other face. A pair of complementary side locking tab and side locking slot combinations are utilized to removably couple or link a respective triangular side section to a first main box section. For example, the first section may include a side locking tab extending from a side edge region. A triangular edge region, adjacent the first main section, may include a side locking slot into which the side locking tab is inserted when the first section is brought adjacent the triangular side section. The box also includes, in a minimal construction, a first and a second handle portion, one of which extends from a top edge region of the first section and the other one extends from the top edge region of the third section. A retaining device holds the first and second handle panels together when they are placed in abutment. For example, a complementary locking handle slot and locking handle tab combination may be utilized. When the triangular box is formed, by insertion of the side locking tabs into the side locking slots and retention of the first and second handle panels, the triangular box simultaneously displays advertising indicia on at least two exposed faces thereof and safety sign indicia on two other distinct exposed faces. Even if the triangular box is formed such that the back faces of the first three sections are exposed and the back faces of the two triangular sections are exposed, two exposed independent surface faces display advertising indicia and at least two other exposed faces display safety sign indicia. The rectangular box may further include an elongated slot long enough to accommodate insertion of flat sheet promotional materials therethrough. This slot can be formed in the first or the third main section. Accordingly, the reversible triangular box can be used as a promotional device which, at the same time, provides automotive safety signs as well as advertising indicia, and the box can retain flat sheet promotional materials. At trade shows, the triangular box could be given away and participants or visitors to the trade show could carry box, accumulate other promotional materials in the box, and yet the box simultaneously display advertising indicia and safety sign indicia. The safety sign indicia provides motivation to the trade show participants and visitors to keep the box, and the advertising indicia can be used to promote a company's particular goods or services.

BRIEF DESCRIPTION OF THE DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENT

The present invention relates to a reversible triangular box with advertising and safety signs on alternate facing sides thereof.

Figure 1:
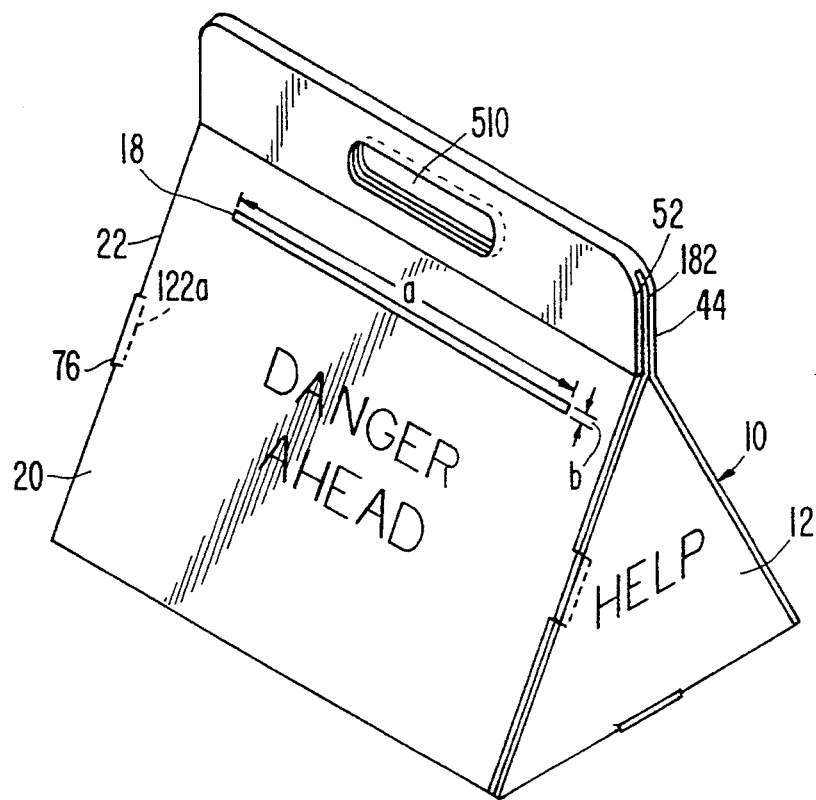
FIG. 1 diagrammatically illustrates a perspective view of the reversible triangular box showing two exposed faces.

FIG. 1 diagrammatically illustrates triangular box 10 having an automotive safety sign indicia (HELP) on exposed triangular side face 12 and a different automotive safety sign indicia (DANGER AHEAD) on exposed rectangular section face 20. Exposed face 20 is the exposed face of box section 22. Section 20 includes, in the illustrated embodiment, an elongated slot 18 which is large enough to accommodate the insertion of flat sheet promotional materials. Slot 18 is at least 12" long (dimension a) to accommodate the sideways insertion of an 8½"×11" sheet of paper. The width (dimension b) of slot 18 can vary. Preferably, the width is approximately ¼" to ½". Of course, slot 18 can be configured as a larger opening to accommodate different sizes of promotional materials. Rather than a slot, the box may have a large opening to accommodate promotional materials of various sizes.

Figure 2:
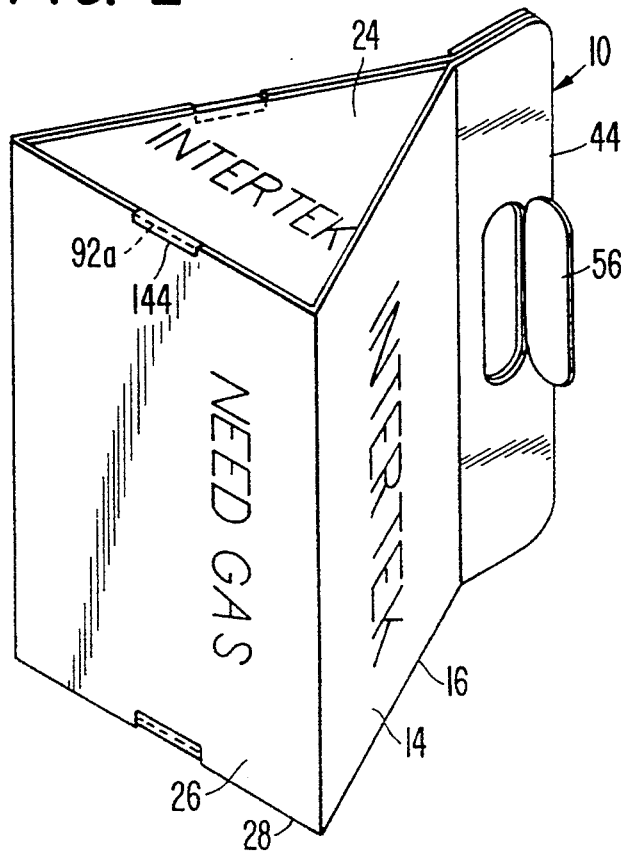
FIG. 2 diagrammatically illustrates a perspective view of the reversible triangular box showing the remaining three exposed faces of the box.

FIG. 2 diagrammatically illustrates triangular box 10 and particularly shows advertising indicia on exposed face 14 (INTERTEK) of box section 16. Advertising indicia (INTERTEK) is imprinted or carried by triangular section face 24. An automotive safety sign indicia (NEED GAS) is imprinted or carried by exposed face 26 of second box section 28. Accordingly, once the triangular box is formed, advertising indicia is simultaneously displayed along with safety sign indicia on distinct and independent box faces. The triangular box can be given out at trade shows and participants and visitors at those trade shows could collect promotional materials by inserting the same through slot 18 or other types of openings which could be larger than slot 18. Since the triangular box is made of heavy duty, corrugated cardboard and since the box contains and displays automotive safety sign indicia, participants and visitors to the trade show are motivated to take the box from a particular booth and use the box to collect other promotional material during the show. Since the box simultaneously displays advertising indicia (INTERTEK) and safety sign indicia, the visitors and trade show participants, by carrying the box through the trade show, promote the commercial advertising aspect of the box. Further, after leaving the trade show, these participants and visitors are motivated to use the box in their automobiles, thereby reinforcing the commercial advertising aspect of the box. As discussed in detail hereinafter, each exposed face of the triangular box is imprinted with either a safety sign indicia or advertising indicia. Accordingly, it does not matter how the box is initially constructed or reconstructed by the user since at least two exposed faces will always display advertising indicia and at least two exposed faces will always display automotive safety sign indicia. The utility of the box is further enhanced since, if the user desires to display other automotive safety signs (discussed with respect to FIG. 4), the user simply disassembles the box and reassembles the box exposing the alternate faces thereof.

The automotive safety sign indicia and the commercial advertising indicia could be imprinted on the box in fluorescent, bright neon, or other high distinctive and clearly visible print.

Figure 3:
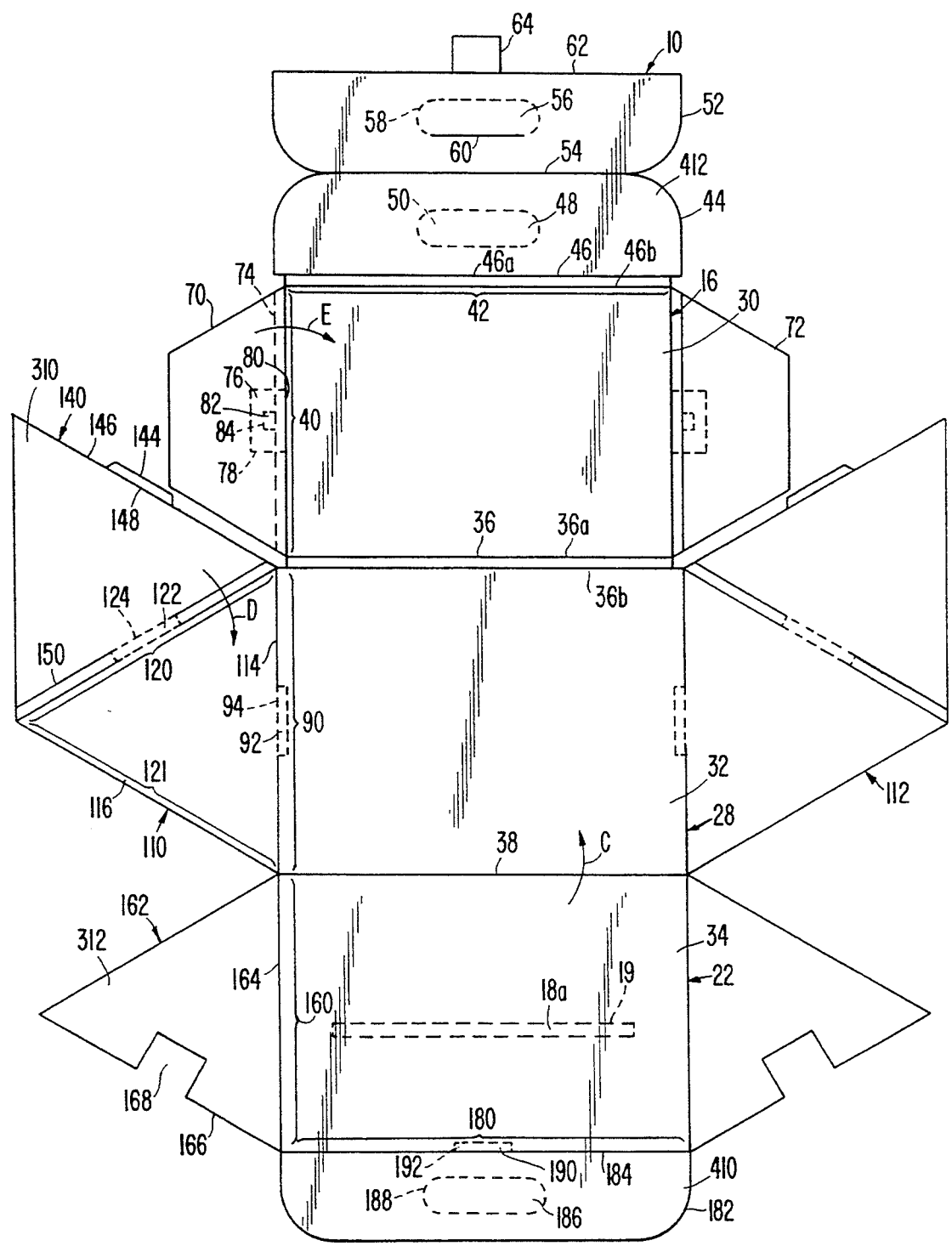
FIG. 3 illustrates as a laid out plan view of the box.

FIG. 3 illustrates a laid out view of the reversible triangular box 10. The reversible triangular box includes first box section 16 having a back face 30. The front face 14 of first section 16 is shown in FIG. 2. The box also includes an intermediate second section 28 having a back face 32. The front face of intermediate section 28 is shown as front face 26 in FIG. 2. The box also includes a third section 22 having a back face 34. Front face 20 of third section 22 is shown in FIG. 1. Box sections 16, 28 and 22 collectively form a generally rectangular sheet which sectionally is divided by major folds 36, 38. In the preferred embodiment, major fold 36 is a double fold includes fold lines 36a and 36b to accommodate a triple thickness triangular wall described later.

First section 16 has side edge regions, one of which is side edge region 40. Since the left and right sides of triangular box 10 are substantially identical, the major components on the left side are described in detail. The right side components are substantially similar to the components on the left side except the left side is a mirror image of the right side components. First section 16 also includes a top edge region 42. Extending or depending from top edge region 42 is a first handle panel 44. Handle panel 44 is separated from first section 16 via a handle fold 46. In the preferred embodiment, handle fold 46 is a double fold consisting of fold lines 46a and 46b. Double fold 46 is utilized to accommodate the triple fold handle member that is described in detail later. Handle panel 44 includes a detachable handle locking slot cutout panel 48. Cutout panel 48 can be removed from handle panel 44 by pushing cutout panel 48 along perforated lines 50. In the preferred embodiment, triangular box 10 includes a third handle panel 52 depending or extending from first handle panel 44 via handle fold 54. The third handle panel includes a hinged handle locking tab 56 that can be partially separated from handle panel 52 by punching out tab 56 along perforated lines 58. Tab 56 is hinged to handle panel 52 via hinge 60. Handle panel 52 also includes a top edge 62 from which extends or depends supplemental handle locking tab 64.

In the preferred embodiment, first section 16 includes depending or extending flap sides 70,72. Flap side 70 extends from side edge region 40. It is delineated by via double flap folds 74 adjacent section 16. The double flap folds are used to accommodate the triple thickness triangular wall of the triangular box which is described later.

Flap side 70 also defines a side locking tab 76 which extends or depends from side edge region 40. Side locking tab 76 is partially removable from flap side 70 by depressing the tab along perforated lines 78. Side locking tab 76 is hinged to section 16 by hinge 80. Additionally, side locking tab 76 includes removable finger hole panel 82. A finger hole is created in side locking tab 76 by removing the finger hole panel 82 along perforated lines 84. Opposing flap side 72 also includes a side locking tab and other features described above with respect to flap side 70.

The second, intermediate section 28 includes side edge regions, one of which is side edge region 90. Second section 28 includes, in side edge region 90, a bottom locking slot panel 92 which is removable from section 28 via perforated lines 94.

Depending or extending from second section 28 is a pair of first triangular side sections 110 and 112, each depending or extending from opposing side edge regions. Triangular sections 110 and 112 are linked to second section 28 via respective side folds, one of which is side fold 114 for triangular side section 110. Each triangular side section includes a back face and a front face one of which is exposed upon formation of the triangular box. Triangular side section 110 includes back face 116. Triangular side section 110 includes a front face 24, shown in FIG. 2. Triangular side section 112 includes front face 12, shown in FIG. 1.

Triangular side sections 110 and 112 include proximal triangular side edge regions, one of which is triangular side edge region 120 for triangular side section 110. The term "proximal" refers to the positioning of a component relative to first box section 16. Side region 120 is proximal to box section 16 as compared with the side region 121. Triangular side section 110 defines a side locking slot panel 122 which can be removably detached from triangular edge region 120 by pushing panel 122 and breaking perforated lines 124. Extending or depending from triangular edge region 120 is a proximal supplemental triangular section 140. Triangular side edge region 120 is adjacent or near first section 16, as is supplemental triangular section 140. Supplemental triangular section 140 includes a bottom locking tab 144 extending or depending from proximal edge 146 of supplemental triangular section 140. Tab 144 is hinged to supplemental triangular section 140 via hinge fold 148. Supplemental triangular section 140 is separated from triangular side section 110 via a supplemental triangular side double fold 150. Double fold 150 is provided to accommodate the triple thickness side wall discussed below.

Third box section 22 includes a pair of opposing side edge regions, one of which is side edge region 160.

Third section 22 has a pair of second triangular sections depending from opposing side edge regions. One of these triangular sections is triangular wall section 162. Triangular wall section 162 is separated or delineated from third section 22 by a side fold line 164. Triangular section 162 has an outboard or remote edge 166 defining a cutout 168. Cutout 168 enables insertion of side locking tab 76 when the triangular box is constructed with a triple thickness triangular side wall.

Third box section 34 includes a top edge region 180 to which is attached, in a depending or an extending manner, a second handle panel 182. A handle panel fold line 184 delineates section 22 from handle panel 182. Handle panel 182 also includes a handle locking slot panel 186 which can be removably detached from handle panel 182 via perforated line 188. Third section 22 also includes a supplemental handle locking slot panel 190 which can be removably detached from section 22 via perforated lines 192.

Third box section 22 includes removable slot panel 18a which can be removed from section 22 via perforated lines 19. Upon removal of slot panel 18a, slot 18 (shown in FIG. 1) is formed in section 22.

Triangular box 10 is formed as follows. All slot panels are removed, that is, handle locking slot panel 48, finger hole panel 82, side locking slot panel 122, bottom locking slot panel 92, supplemental handle locking panel 190, removable slot panel 18a, and handle locking slot panel 186 are removed. The locking slot panels on the right hand side of FIG. 3 are also removed. Third section 22 is moved upward towards intermediate section 28, as shown by arrow C. The second triangular sections, one of which triangular section 162, are laid atop the back faces of the first triangular sections, that is, back face 116 of first triangular section 110. Supplemental triangular sections (e.g., 140) are then folded, as shown by arrow D such that face 310 of supplemental triangular section 140 lays on top of surface 312 of second triangular section 162. Bottom locking tab 144 is inserted into bottom locking slot 92a. Bottom locking tab 144 and bottom locking slot 92a are shown in FIG. 2.

A triple thickness wall is formed by triangular sections 110, 162, and 140. Thereafter, side flap 70 is folded as shown by arrow E into the interior of the partially formed triangular box. Side locking tab 76 is then inserted into side locking slot 122a formed by the removal of side locking slot panel 122. Side locking tab 76 is shown in FIG. 1 as extending into side locking slot 122a.

Thereafter, panel surface 410 of handle panel 122 is brought into abutment with handle panel surface 412 of handle panel 44. Handle panel 52 is then folded about fold line 54, thereby capturing handle panel 182. This triple thickness handle member is shown in FIG. 1. Supplemental handle locking tab 64 is then inserted into supplemental handle locking slot 192. This feature is not shown in FIGS. 1 and 2. Hinged handle locking tab 156 is folded about fold line 60 to pass through the handle panel locking slots generally designated by opening 510 in FIG. 1. FIG. 2 shows handle panel tab 56 wrapped about the exposed surface of handle panel 44.

Figure 4:
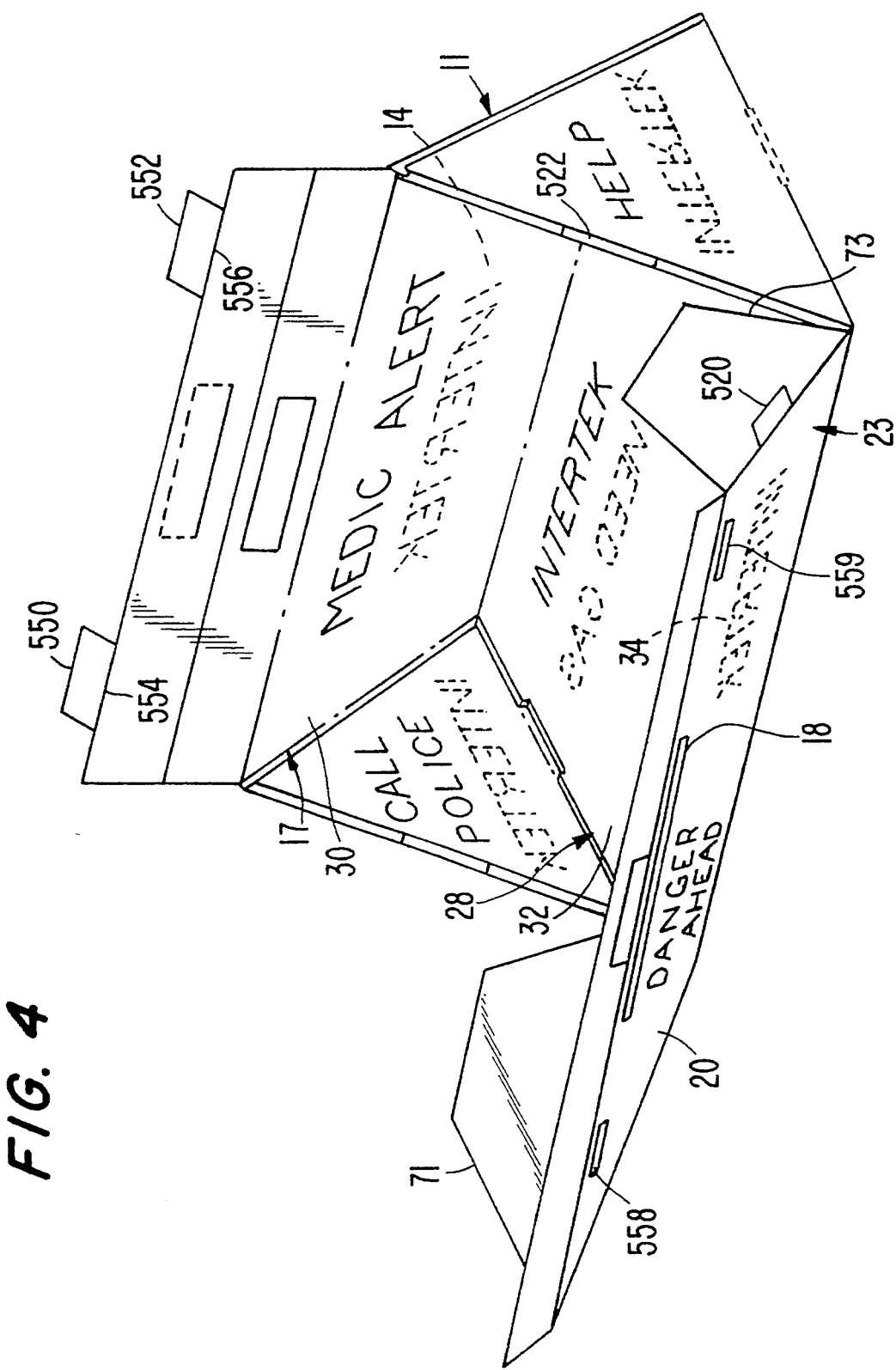
FIG. 4 diagrammatically illustrates a perspective view of the reversible triangular box in a partially formed condition.

FIG. 4 shows a perspective of triangular box 11 wherein third box section 23 has been opened to show the interior of the triangular box. Triangle box 11 differs from triangle box 10 (FIGS. 1–3) in that box section 23 has side flaps 71,73 similar to flaps 70,72 in FIG. 3. A second triangle section (like triangle section 162 in FIG. 3) extends from box section 17 (FIG. 4) to form the intermediate portion of a triple wall. Side tab 520 on flap 73 will be inserted into side locking slot 522. Flaps 71 and 73 are disposed in the interior of the triangular box. Side flaps 71 and 73 are utilized to entrap any promotional material inserted into the interior of the box slot 18 in section 23. Side flaps 71, 73 are similar to side flaps 70,72 in FIG. 3. Triangular box 11 includes secondary handle tabs 550 and 552 which are folded about fold lines 554 and 556 into slots 558 and 559 of box section 23.

As shown in FIG. 4, both the front face and back face of each box section and triangular wall section are imprinted with certain indicia. For example, section 23 has front face 20 bearing the automotive safety sign indicia DANGER AHEAD. The back face of section 23 is imprinted with advertising indicia INTERTEK. If the box is assembled with the back face of each major side section exposed to the environment, the box displays INTERTEK, INTERTEK, MEDIC ALERT. The back faces of the exposed triangular side faces display CALL POLICE and INTERTEK. If the front face of each box section is exposed, the assembled box displays DANGER AHEAD, NEED GAS, INTERTEK, HELP and INTERTEK.

The following sign table illustrates that, if the front face of any particular section shows commercial advertising indicia, the back face of that section shows safety sign indicia. Further, of the three main sections, the front faces of any two will show advertising indicia while the front face of the third section shows safety sign indicia. Also, with respect to the two triangle wall sections, the front face of one triangle wall will show advertising indicia while the front face of the other triangle wall shows safety sign indicia. Accordingly, notwithstanding how the box is constructed, the box will always display, as an outside exposure, at least two commercial advertising indicia on independent, distinct box faces and at least two safety sign indicia on independent and distinct box faces. The sign table for box 10 follows.

| Side | SIGN TABLE | |
|---|---|---|
| | Face | Sign |
| 1st Section | Front | INTERTEK |
| | Back | MEDIC ALERT |
| 2nd Section | Front | NEED GAS |
| | Back | INTERTEK |
| 3rd Section | Front | DANGER AHEAD |
| | Back | INTERTEK |
| Triangle Section | Front | INTERTEK |
| | Back | CALL POLICE |
| Triangle Section | Front | HELP |
| | Back | INTERTEK |

It should be noted that, although particular locking tabs and locking slots have been shown in these drawings, the particular positions of the locking tabs can be reversed with respect to the locking slots. For example, side locking slot 122a can be placed on section 30 and side locking tab 76 can be defined on triangular wall section 110. In its most minimal configuration, the triangular box must include box main sections 16, 28 and 22, triangular side sections 110 and 112, and handle panels 44 and 182. In this minimal construction, a side locking tab and slot combination or other coupling system should be used to removably link or couple section 16 to triangular side panels 110 and 112. Further, some system of retaining handle panel 44 in abutment with handle panel 182 must be provided, such that panel surface 410 abuts and is juxtaposed next to handle panel surface 412. A retaining system such as rubberbands, paper clips, or locking tabs and slots could be used to mate the two handle portions together.

The claims appended hereto are meant to cover modifications and changes within the spirit and scope of the present invention.

What is claimed is:

1. A reversible triangular box with advertising and safety signs on alternate facing sides thereof comprising:

a generally rectangular sheet divided into a first, an intermediate second, and a third rectangular sections by two major folds, each rectangular section having a respective front and back face and each rectangular section having advertising indicia on one of the front and back face thereof, and each rectangular section having safety sign indicia on the other of the front and back face thereof, each rectangular section having respective side edge regions normal to said major folds and said first and third rectangular sections each having top edge regions opposite said major folds;

two triangular side sections extending from said side edge regions of said intermediate second rectangular section and linked thereto via respective side folds, each said triangular side section having a respective triangular front and back face, each triangular side section having further advertising indicia on one of the triangular front and back face thereof and further safety sign indicia on the other of the triangular front and back face thereof, each triangular side section having a respective triangular edge region;

a pair of complementary side locking tabs and side locking slot combinations, one tab and slot combination defined on opposing side edge regions of said first rectangular section and corresponding triangular edge regions of respective triangular side sections, corresponding triangular edge regions being adjacent opposing side edge regions of said first rectangular section, such that when said corresponding triangular edge regions abut said side edge regions of said first rectangular section, said side locking tabs are inserted into said side locking slots thereby removably linking said triangular side sections to said first rectangular section;

a first and a second handle panel, said first handle panel extending from said top edge region of said first rectangular section, said second handle panel extending from said top edge region of said third rectangular section; and means for retaining said first and second handle panels together in abutment;

whereby said triangular box always simultaneously displays advertising indicia on at least two exposed faces thereof and safety sign indicia on at least two further exposed faces thereof even though said back faces are exposed or said front faces are exposed.

2. A reversible triangular box as claimed in claim 1 including an opening in one of said first and third rectangular sections, said opening large enough to accommodate insertion of promotional materials therethrough.

3. A reversible triangular box with advertising and safety signs on alternate facing sides thereof and adapted to carry flat sheet promotional materials therein comprising:

a generally rectangular sheet substantially equally divided into a first, an intermediate second, and a third rectangular sections by two major folds, each rectangular section having a respective front and back face and each rectangular section having advertising indicia on one of the front and back face thereof, and each rectangular section having safety sign indicia on the other of the front and back face thereof, each rectangular section having respective rectangular side edge regions normal to said major folds and said first and third rectangular sections each having top edge rectangular regions opposite said major folds;

two triangular side sections depending from said rectangular side edge regions of said intermediate second rectangular section and linked thereto via respective side folds, each said triangular side section having a respective triangular front and back face, each triangular side section having further advertising indicia on one of the triangular front and back face thereof and further safety sign indicia on the other of the triangular front and back face thereof, each triangular side section having a respective triangular edge region;

a pair of complementary side locking tabs and side locking slot combinations, one tab and slot combination defined opposing respective rectangular side edge regions of said first rectangular section and corresponding triangular edge regions of respective triangular side sections, said corresponding triangular edge regions being adjacent opposing rectangular side edge regions of said first rectangular section, such that said side locking tabs are inserted into said side locking slots thereby removably linking said triangular side sections to said first rectangular section;

a first and a second handle panel, said first handle panel depending, via a first handle fold, from said top edge rectangular region of said first rectangular section, said second handle panel depending, via a second handle fold, from said top edge rectangular region of said third rectangular section; and a complementary locking handle slot and locking handle tab combination, said handle tab and slot combination formed on said first and second handle panels and removably linking said first and second handle panels and hence said first and third rectangular sections together when said handle panels are adjacent and said handle tab is inserted into said handle slot;

whereby said triangular box always simultaneously displaying advertising indicia on at least two exposed faces thereof and safety sign indicia on at least two further exposed faces thereof even though said back faces are exposed or said front faces are exposed; and an elongated slot in one of said first and said third rectangular sections, said elongated slot long enough to accommodate insertion of flat sheet promotional materials therethrough when said triangular box is formed.

4. A reversible triangular box as claimed in claim 3 wherein the front faces of said first and second rectangular sections carry additional advertising indicia thereon and said front face of said third rectangular section carries additional safety sign indicia thereon, said front and back triangular faces of one triangular side section respectively carry supplemental advertising indicia and safety sign indicia thereon, and said back and front triangular faces of the other triangular side section respectively carry extra advertising indicia and said safety sign indicia thereon.

5. A reversible triangular box as claimed in claim 4 wherein the back faces of said first and second rectangular sections carry spare advertising indicia thereon and said back face of said third rectangular section carries spare safety sign indicia thereon.

6. A reversible triangular box as claimed in claim 5 wherein said triangular side sections are first triangular sections;

the box including:
second triangular sections depending from opposing rectangular side edge regions of said third rectangular section via corresponding side folds;
a respective tertiary triangular section depending from each forward facing first triangular side edge region of each said first triangular section near said side locking tab and slot combination via a corresponding tertiary side fold;
a pair of complementary bottom locking tab and slot combinations, one bottom tab and slot combination defined on each of the opposing rectangular side edge regions of said second rectangular section and on a respective tertiary forward facing triangular side edge region, said tertiary forward facing triangular side edge region being adjacent said first rectangular section;
whereby said second triangular sections are disposed intermediate said first triangular sections and said tertiary triangular sections, and said bottom locking tabs are inserted into said bottom locking slots to form a triple thickness side wall for said triangular box.

7. A reversible triangular box as claimed in claim 6 including a pair of flap sides, a corresponding flap side linked to said first rectangular section along a corresponding first rectangular side edge region via a corresponding flap fold, said flap sides disposed within said triangular box after formation of said triple thickness side walls, said side locking tab and slot combination formed near said flap fold.

8. A reversible triangular box as claimed in claim 7 wherein said first handle panel includes a first and a third handle panel, said third handle panel linked to said first handle panel via an intermediate handle fold, said second handle panel being disposed intermediate said first and third handle panels during use, said second and third handle panels including handle cut-outs through which said locking handle tab extends to lock and form a triple thickness handle member for said triangular box.

9. A triangular box comprising:
a generally rectangular sheet divided into a first, an intermediate second, and a third rectangular section by two major folds, each rectangular section having respective opposing side rectangular edge regions normal to said major folds and said first and third rectangular sections each having top rectangular edge regions opposite said major folds;
two triangular side sections extending from said side rectangular edge regions of said intermediate rectangular section and linked thereto via respective side folds which are adjacent triangular edge regions;
a pair of complementary side locking tab and slot combinations, one tab and slot combination defined on each opposing respective side rectangular edge regions of said first rectangular section and corresponding triangular edge regions of triangular side sections, such that when said corresponding triangular edge regions abut said side rectangular edge regions of said first rectangular section, said side locking tabs are inserted into said side locking slots thereby removably linking said triangular side sections to said first rectangular section;
a first and a second handle panel, said first handle panel extending from said top rectangular edge region of said first rectangular section, said second handle panel extending from said top rectangular edge region of said third rectangular section; and
means for retaining said first and second handle panels together in abutment.

10. A triangular box as claimed in claim 9 including an opening in one of said first and said third rectangular sections, said opening being large enough to accommodate insertion of promotional materials therethrough when said triangular box is formed.

11. A triangular box as claimed in claim 9 wherein each rectangular section has a front rectangular face and each triangular side section has a front triangular face, each front rectangular face of each rectangular section having one of advertising indicia and safety sign indicia thereon such that said triangular box simultaneously displays independent indicia on each exposed front face thereof.

12. A triangular box as claimed in claim 11 wherein said front rectangular faces of two rectangular sections carry advertising indica thereon and said front triangular face of the triangular section carries safety sign indicia thereon.

13. A triangular box as claimed in claim 11 wherein said front triangular faces of two triangular sections carry safety sign indica thereon and said front rectangular face of the rectangular section carries advertising indicia thereon.

14. A triangular box as claimed in claim 11 including an opening in one of said first and third rectangular sections, said opening being large enough to accommodate insertion of promotional materials therethrough when said triangular box is formed.

* * * * *